UNITED STATES PATENT OFFICE.

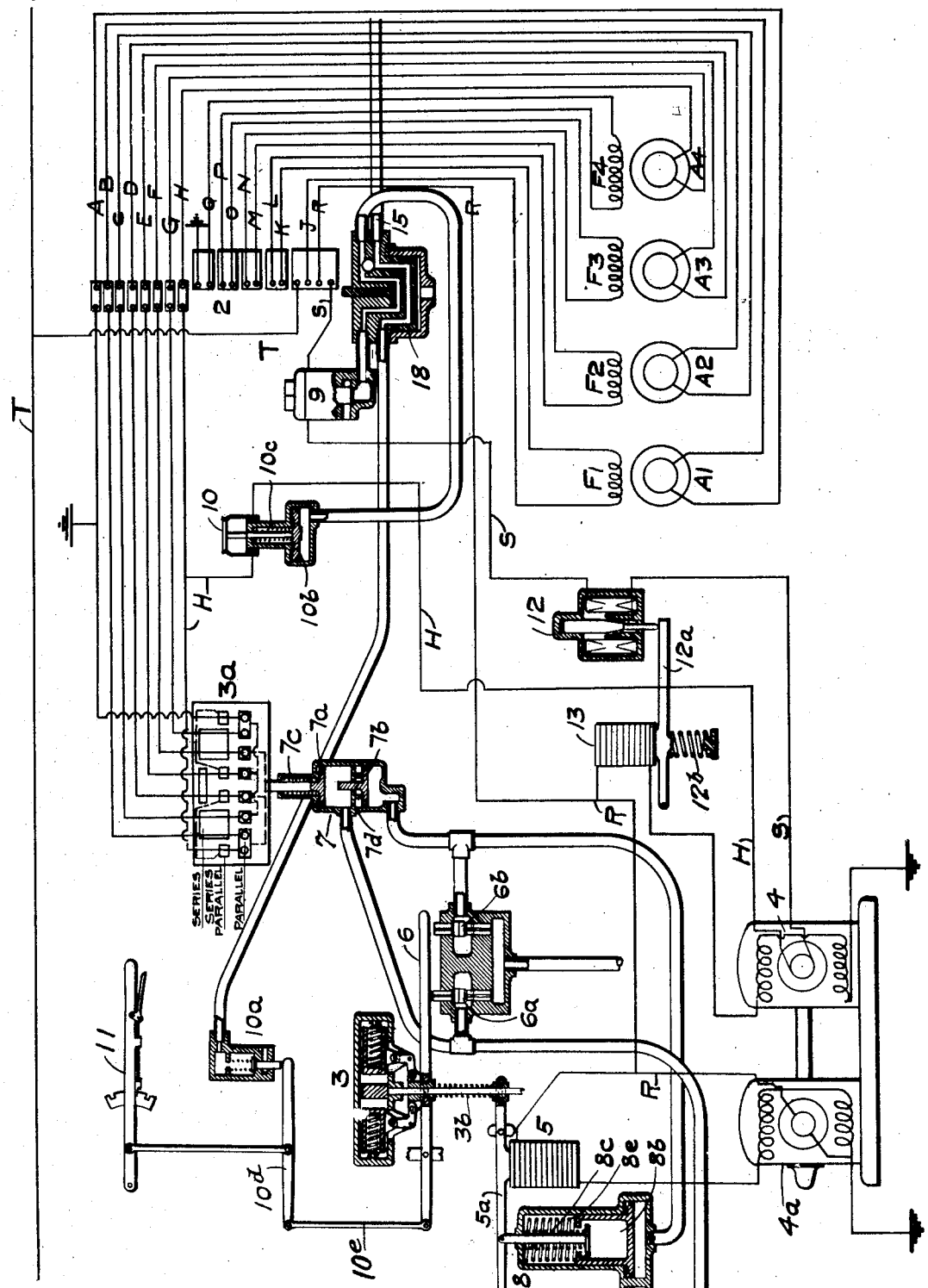

WALTER V. TURNER, OF WILKINSBURG, AND THOMAS H. THOMAS, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA.

REGENERATIVE BRAKING SYSTEM.

1,322,844. Specification of Letters Patent. Patented Nov. 25, 1919.

Application filed February 5, 1916. Serial No. 76,237.

*To all whom it may concern:*

Be it known that we, WALTER V. TURNER and THOMAS H. THOMAS, citizens of the United States, residing at, respectively, Wilkinsburg and Edgewood, in the county of Allegheny and State of Pennsylvania, have jointly invented a certain new and useful Improvement in Regenerative Braking Systems, of which improvement the following is a specification.

In electric traction systems where direct current is employed for propelling the vehicles, it is well known that the motors may serve as generators when driven by the momentum of the vehicle, and that such generated current, or a portion of it, may be returned to line conductor or source of supply if the current generated is at a voltage sufficiently greater than the line voltage, and that when operating in this manner, the generator also serves as a braking element for retarding the vehicle when descending grades or for deceleration when running on a level track. Such regenerative braking systems have not, however, heretofore proved to be very efficient either in braking nor in the amount of current restored, on account of the comparatively limited time at which vehicle is being driven by its momentum at a sufficiently high rate of speed to overcome the voltage of the line.

If a direct current motor when being driven by the momentum of the vehicle at a given speed is restoring a certain amount of energy to the line and thus acting as a braking generator to retard the vehicle, it is apparent that, as the speed decreases, the induced voltage of the motor also diminishes, and consequently less and less current is returned to the line until the induced voltage falls to that of the line when further regeneration is impossible, and the braking effect ceases. If, notwithstanding the diminishing speed of the vehicle, the regenerated voltage could be maintained above the line voltage, some current could be restored to the line, or distributing system, throughout a much longer period of time, and the braking effect could be utilized until the vehicle is brought nearly to a complete standstill.

One of the objects of this invention, therefore, is to provide means whereby the voltage generated by the motors acting as braking generators, and impressed on the distributing system, may be maintained within predetermined limits until a certain minimum speed has been reached, at which time the air brakes may be employed to complete the stop.

Where a plurality of motors are employed, such as a four motor equipment, for propelling the vehicle, and the motors are acting as generators driven by the momentum of the vehicle, the maximum voltage for a given speed will be developed when the motor-generators are connected in series, while only half this voltage will be developed at the same speed when they are connected in series parallel, and still less voltage when they are connected in full parallel. In order to compensate for the reduction in speed and maintain the higher voltage output from the motor-generators, one of the features of our improvement contemplates the automatic changing of the motor connections from parallel at high speed to series-parallel and then to full series as the speed diminishes, whereby the high voltage may be kept up during the major portion of the stopping period.

Another feature of our improvement comprises the use of a booster, or equivalent means, in series with the generator circuit for raising the voltage therein to compensate for the diminishing speed of the generators during the respective periods that the same are connected either in parallel, or in series-parallel, or in series, the booster being driven by any suitable means, and operating to automatically maintain the voltage either by varying the strength of its field, or by varying the speed of the driving motor.

According to another feature of our invention, the air brake system is combined with the regenerative system to produce certain results, since it will be evident that when operating at slow speeds and when the regenerated current falls below a predetermined amount, as when completing a stop, it is desirable that the air brake be used, and our improvement therefore also contemplates means for automatically applying the air brake when the regenerated current falls to a certain minimum.

As a feature of safety, it is desirable that at the time of regeneration, there should be a limit to the maximum speed permissible upon certain grades, and at various points along the road, so that the maximum speed allowed at such points will be such that the air brakes alone could properly control the train, if, for any reason, the regenerative system should fail. With this in view, our improvement further contemplates a provision for automatically applying the air brakes in case the speed of the vehicle exceeds the desired maximum at the time that the regenerative system is in operation, and also means for manually adjusting this maximum allowable speed according to the grade or other conditions of the track.

The features of our improvement are adapted to be carried out in a variety of different forms, and we do not therefore limit ourselves to any specific arrangement or particular construction of parts.

In the accompanying drawing, the figure illustrates, in diagram, one form of regenerative braking system embodying our improvement, and applied to a vehicle with a four motor equipment.

The electric connections, including the circuits, controllers, switches, etc., for controlling the motors in propelling the vehicle, are not shown in the drawing, and only a sufficient number of contacts representing a brake switch or controller, 2, are shown connected to the local or regenerative circuits of the motors, as are necessary to illustrate the operations during the regenerative braking periods. The contacts of the brake switch, 2, are indicated in the closed position, that is, the position to which this switch is moved to open the propelling circuits and connect up the motors to act as generators in the regenerative circuit for braking purposes and for restoring energy to the line.

It will be understood that the contacts for the brake switch, 2, may be mounted upon or operated by the running controller or master controller when turned to a certain braking position, or may be operated by a separate switch handle, or be connected up to the propelling system in any suitable or preferred manner, and it is not deemed necessary to further illustrate the circuits and control of said propelling system, since it is well understood by those familiar with the art as to how the regenerative system, as herein illustrated, may be properly connected into the propelling system of the motors.

In the drawing, we have illustrated, diagrammatically, a four motor equipment comprising armatures, $A^1$, $A^2$, $A^3$, $A^4$, connected by suitable leads, A, B, C, D, E, F, G and H, through contact bars on switch, 2, with corresponding contact fingers of a series-parallel regulating or change over switch, $3^a$, and motor fields, $F^1$, $F^2$, $F^3$, $F^4$, having leads, J, K, L, M, N, O, P, Q, suitably connected through corresponding contact bars on switch, 2, when in braking position. The change over switch, $3^a$, may be operated by various forms of speed controlled means which serve to shift the relation of the generators according to certain variations in the speed of the vehicle, the means, as shown, comprising a centrifugal governor, 3, the shaft of which may be driven from an axle of the vehicle and operate through lever, 6, to open and close the valves, $6^a$ and $6^b$, for controlling the supply of fluid to and exhaust from the pistons, $7^a$ and $7^b$, of cylinder, 7. A partition, $7^d$, divides the cylinder into separate chambers for the respective pistons, the piston, $7^a$, being connected to actuate the switch, and having a spring, $7^c$, opposing the action of the fluid pressure.

When the vehicle is traveling at or above a certain speed, at which the governor raises the lever, 6, to close the exhaust and open both valves, $6^a$ and $6^b$, to admit fluid to both pistons, $7^a$ and $7^b$, the switch, $3^a$, is held in full parallel position, as shown in the drawing. When the speed diminishes sufficiently to close one valve, $6^a$, and open the exhaust from piston, $7^a$, the spring, $7^c$, shifts the switch to the series-parallel position, at which point the piston, $7^a$, engages piston, $7^b$, and is held until the speed is further reduced sufficiently for the governor to close valve, $6^b$, and open the exhaust from piston, $7^b$, whereupon the spring moves both pistons and the switch to the series position.

A booster, 4, is employed for raising the voltage of the regenerated current from the motor generators sufficiently above the line voltage to return current to the line, and to maintain the regenerated voltage as the speed diminishes, the booster being driven by a motor, $4^a$, with current from the line through the wire, R, leading from the regenerative braking switch, 2. One of the armature terminals of the booster is connected to the return lead, H, from the generators, the other armature terminal being connected by wire, S, with the line, T, through a contact bar on regenerative switch, 2. The field of the booster is energized by current from the line through wire, R, and may be controlled by a rheostat, 13, governed by the solenoid or magnet, 12, inserted in the regenerative circuit wire, S, whereby the strength of the booster field may be automatically adjusted by said regenerated current to maintain a substantially constant current regardless of fluctuations in line voltage or other conditions which might vary the output of the generators. The booster is also governed by the speed of the vehicle in order to compensate for the reduction in speed during the respective periods that the motors are connected up in their different relations by 13 the change over switch, $3^a$. This may be conveniently done by inserting a rheostat, 5, in the field circuit of the motor, $4^a$, the rheostat being controlled by the speed governor, 3. As shown in the drawing, a carbon rheostat is employed having a lever, $5^a$, for exerting a varying pressure on the carbon disks to vary the resistance in the fields of the motor, $4^a$. A spring, $3^b$, acts upon lever, $5^a$, tending to diminish the pressure upon the carbon rheostat, and thereby increase the resistance, the force of the spring, $3^b$, being regulated by the movement of the weights of the governor, 3. Another spring, $8^c$, acts on the lever, $5^a$, in the opposite direction and tends to increase the pressure on the carbon rheostat. The effective pressure acting on the rheostat is, therefore, the difference between the force of the springs, $3^b$ and $8^c$, and as the shifting of the governor weights, due to variation in speed, also varies the force of the spring, $3^b$, the resistance of the rheostat, and consequently the speed of the motor, $4^a$, is accordingly regulated to compensate for the diminishing speed of the motor generators. In order to continue this regulation through each period of regeneration for the different positions of the change over switch, $3^a$, other springs, $8^d$, and $8^e$, are mounted to act on the lever, $5^a$, but are held out of operation by means of the pistons, $8^a$ and $8^b$, when the change over switch is in full parallel position, the valves, $6^a$ and $6^b$, also controlling the supply of fluid to these pistons. When these valves are operated by the governor, to release fluid from the pistons, $7^a$ and $7^b$, fluid is also released from pistons, $8^a$ and $8^b$, thus throwing the force of the springs, $8^d$ and $8^e$, onto the lever, $5^a$.

The coil of the magnet valve, 9, is inserted in the return wire, S, so that when the speed of the vehicle and the corresponding regenerated current has diminished, to a predetermined low amount, this valve is automatically opened to vent air from a pipe of the air brake system, and cause an application of the air brakes to complete the stop. Another vent valve, $10^a$, is arranged to be operated to likewise vent air from the pipe of the air brake system when the speed of the vehicle exceeds a predetermined maximum degree, such vent valve being conveniently actuated by the governor through a lever, $10^d$, and a rod, $10^e$, connecting the same with the lever, 6. This maximum speed may be adjusted to any point desired by means of the hand lever device, 11, connected to shift the fulcrum of lever, $10^d$. It is preferred that this device be so adjusted as to cause an automatic application of the air brakes whenever the speed of the vehicle exceeds what may be safely controlled by means of the air brakes without the assistance of the regenerative braking system.

Communication from the pipe, 15, of the air brake system to the vent valves, 9 and $10^a$, is preferably controlled by a valve, 18, operated manually at the same time that the regenerative braking switch, 2, is thrown, and preferably attached thereto, whereby said communication is cut off when the brake switch is turned to the running position, and opened when the brake switch is thrown to the position shown in the drawing for establishing the regenerative circuits. For the purpose of cutting off the regenerative circuits when the speed of the vehicle has reduced to the minimum, at which the vent valve, 9, is opened, a switch, 10, is inserted in the return wire, H, from the generators, the switch being held closed by piston, $10^b$, and air admitted through valve, 18, from the pipe, 15, of the air brake system when the brake switch, 2, and valve, 18, are turned to the position shown. When the vent valve, 9, is opened, it also releases the air pressure from piston, $10^b$, and the spring, $10^c$, then automatically opens the circuit, H. The maximum speed vent valve, $10^a$, is, however, preferably so connected as to reduce the air pressure for causing an application of the air brakes, but not to release the pressure from piston, $10^b$. The switch, 10, thus remains closed at that time so that the combined braking effect from the regenerative system and the air brake system is produced. As soon as the speed is reduced to the predetermined safe amount for which the apparatus is adjusted, the vent valve, $10^a$, closes, and the air brakes are automatically released, thus limiting the speed of the vehicle during the regenerative period.

When the brake switch is in running position, the vent valves, 9 and $10^a$, are cut off from the pipe of the air brake system, by means of the valve, 18, which turns with the brake switch, but in braking position, as shown, communication is established from the pipe, 15, of the air brake system to both valves, 9 and $10^a$, and also from the fluid pressure piston, $10^b$, to the vent valve, 9. The regenerative circuit switch, 10, is, therefore, normally held closed by the air pressure acting on piston, $10^b$.

When the vehicle is running, and it is desired to make a brake application, the brake switch, 2, is thrown to braking position, thereby connecting up the motors to act as generators in the regenerative circuit, to restore current to the line, T. The change over switch, $3^a$, then occupies one of its positions depending upon the speed of the vehicle and of the governor, 3. The armature of the booster, 4, is connected in series with the regenerative circuit through leads, H and S, while current from the line flows to the fields of the booster and to the armature and fields of the motor, $4^a$, through the wire, R. Let us suppose that the speed of the vehicle and governor, 3, at this time is sufficiently great to hold the change over switch, 3ª, in its full parallel position, as indicated, the course of the regenerated current is then from one terminal of the armatures, A¹, A², A³, A⁴, of the generators in parallel to the return wire, H, switch, 10, through the armature of the booster, 4, wire, S, including the coils of the electromagnets 12 and 9, to contact bar on brake switch, 2, to line, T, and return by ground connection to the negative terminals of the armature of the generators. As shown in the drawings, the fields, F¹, F², F³ and F⁴, of the generators, are at this time connected in series between the line and the ground by the leads, J, K, L, M, N, O, P, Q, and the contact bars on the brake switch, although the circuits may be connected in other ways, if preferred. If the regenerated current rises higher than a certain amount, the force of the magnetic pull of the core of the magnet, 12, acting on the lever, 12ª, will be increased and the pressure of spring, 12ᵇ, on the carbon rheostat diminished, so that less current from the line will flow through the rheostat and the fields of the booster, 4, will be correspondingly weakened, thus regulating the booster to decrease the amount of current flowing back to the line. This feature serves to keep the current flow properly balanced at all times. With the speed at the rate as above indicated, the weights of the governor, 3, move out radially to a position in which the lever, 6, clears the valves, 6ª and 6ᵇ, and a certain tension is exerted upon the spring, 3ᵇ, and transmitted to the lever, 5ª, acting upon the carbon rheostat, 5. With the valves, 6ª and 6ᵇ, in the positions shown, the exhausts are closed, and fluid pressure is admitted to all of the pistons, 7ª, 7ᵇ, 8ª and 8ᵇ, thereby relieving the lever, 5ª, from the force of the springs, 8ᵈ and 8ᵉ, so that the effective pressure acting on the carbon rheostat, 5, will be that which is produced by springs, 8ᶜ and 3ᵇ.

As the speed of the vehicle begins to diminish, due to the retarding effect produced by the generators in regenerating current and restoring same to the line circuit, the governor weights move inward, and thereby tend to increase the force of the spring, 3ᵇ. This has the effect of varying the pressure of lever, 5ª, upon the carbon rheostat, 5, and thereby regulating the motor, 4ª, driving the booster, 4, so as to compensate for the diminishing speed of the vehicle and the generators, and maintain the voltage of the regenerated current above that of the line circuit. As the speed continues to diminish, the further inward movement of the governor weights serves to depress the lever, 6, sufficiently to operate the valve, 6ª, to close its supply port and open its exhaust port, whereupon the fluid is released from pistons, 7ª and 8ª. The spring, 7ᶜ, then moves the piston, 7ª, downward against the stem of piston, 7ᵇ, and throws the switch, 3ª, to its series-parallel position, whereby the voltage generated will be increased, and thereby compensate for the diminished speed of the vehicle. In order to make a corresponding reduction in the speed of the booster to maintain the voltage of the regenerated current substantially constant, the spring, 8ᵈ, is released and exerts its pressure on lever, 5ª, and rheostat, 5. The field of the motor, 4ª, is thereby strengthened and the speed of the booster reduced the desired amount. The current will then be restored to the line throughout another period of further reduction in the speed of the vehicle, during which period the regulation of the motor, 4ª, of the booster, by means of rheostat, 5, spring, 3ᵈ, and governor, will be repeated as before described.

As the speed continues to decrease, the governor weights move farther inward, and depress the lever, 6, to operate the valve, 6ᵇ, thereby releasing fluid from pistons, 7ᵇ and 8ᵇ. The spring, 7ᶜ, then moves the piston farther downward, and throws the switch, 3ª, to the full series position, thus again raising the voltage of the regenerated current. The spring 8ᵉ, is released by the exhaust of fluid from the piston, 8ᵇ, and adds its force to that of springs, 8ᶜ and 8ᵈ, acting on the lever, 5ª, thus again adjusting the rheostat, 5, to reduce the speed of the motor, 4ª, and booster, 4, to correspond with the changed relation of the generators.

The voltage of the regenerated current is thus maintained high enough to flow to the line circuit throughout nearly the full stopping period, but when the speed is reduced to such a low rate that the current fails to hold the magnet valve, 9, closed, this valve opens to vent air from the pipe, 15, and effect an application of the air brakes to complete the stop. The fluid will also be released from the piston, 10ᵇ, at the same time, and the spring, 10ᶜ, operates the switch, 10, to open the regenerative circuit to prevent back flow of current from the line.

If, at the time the brake switch is turned to braking position, the speed of the vehicle is in excess of the desired maximum, as determined by the adjustment of the device, 11, the vent valve, 10ª, will be immediately operated by the governor to discharge air from the air brake system and effect an application of the air brakes. The regenerative braking effect will also be obtained, and the combined action of the two braking systems will soon reduce the speed to a safe amount.

If it be desired to produce a shorter stop at the time of regeneration, the usual air brake system may be employed for such purpose.

Having now described our invention, what

We claim as new and desire to secure by Letters Patent is:

1. A regenerative braking system comprising a plurality of motors, adapted to act as momentum driven generators, a brake switch having contacts for connecting up the generators to restore current to the line, and a series-parallel switch governed by the speed of the vehicle for automatically shifting the relation of said generators.

2. A regenerative braking system comprising a plurality of motors, adapted to act as momentum driven generators, a brake switch having contacts for connecting up the generators to restore current to the line, a booster located in the circuit between said generators and the line, and electro-magnetic means governed by the regenerated current for regulating the resistance in the field circuit of the booster.

3. A regenerative braking system comprising a plurality of motors, adapted to act as momentum driven generators, a brake switch having contacts for connecting up the generators to restore current to the line, a booster located in the circuit between said generators and the line, a motor for driving the booster, and means governed by the speed of the vehicle for controlling said motor.

4. A regenerative braking system comprising a plurality of motors, adapted to act as momentum driven generators, a brake switch having contacts for connecting up the generators to restore current to the line, a booster located in the circuit between said generators and the line, a motor operated by current from the line for driving the booster, and means governed by the speed of the vehicle for controlling resistance in the motor circuit.

5. A regenerative braking system comprising a plurality of motors, adapted to act as momentum driven generators, a brake switch having contacts for connecting up the generators to restore current to the line, a series-parallel switch governed by the speed of the vehicle for shifting the relation of the generators, and a booster for maintaining the voltage in the regenerative circuit.

6. A regenerative braking system comprising a plurality of motors, adapted to act as momentum driven generators, a brake switch having contacts for connecting up the generators to restore current to the line, a series-parallel switch governed by the speed of the vehicle for shifting the relation of said generators, a booster located in the circuit between the generators and the line, and means governed by the speed of the vehicle for controlling said booster.

7. A regenerative braking system comprising a plurality of motors, adapted to act as as momentum driven generators, a brake switch having contacts for connecting up the generators to restore current to the line, a series-parallel switch governed by the speed of the vehicle for shifting the relation of said generators, a booster located in the circuit between the generators and the line, an electro-magnetic means governed by the regenerated current for regulating said booster.

8. A regenerative braking system comprising a plurality of motors, adapted to act as momentum driven generators, a brake switch having contacts for connecting up the generators to restore current to the line, a series-parallel switch governed by the speed of the vehicle for shifting the relation of said generators, a booster located in the circuit between the generators and the line, a motor operated from the line for driving said booster, and means governed by the speed of the vehicle for controlling said motor.

9. In a regenerative braking system, the combination of a plurality of motors, adapted to act as momentum driven generators, a brake switch having contacts for connecting up the generators to restore current to the line, a series-parallel switch for shifting the relation of said generators, a fluid pressure device for actuating said series-parallel switch, and means governed by the speed of the vehicle for controlling the fluid pressure.

10. In a regenerative braking system, the combination of a plurality of motors, adapted to act as momentum driven generators, a brake switch having contacts for connecting up the generators to restore current to the line, a series-parallel switch for shifting the relation of said generators, a cylinder and piston for actuating said series-parallel switch, a valve for controlling the supply of fluid pressure to said cylinder, and a speed governor driven by the momentum of the vehicle for operating said valve.

11. In a regenerative braking system, the combination of a plurality of motors, adapted to act as momentum driven generators, a brake switch having contacts for connecting up the generators to restore current to the line, a series-parallel switch for shifting the relation of said generators, a motor driven booster for maintaining the voltage of the regenerated current, a regulating device governed by the speed of the vehicle for controlling said motor-booster, and means, also governed by the speed, for shifting said series-parallel switch and for adjusting the booster.

12. In a regenerative braking system, the combination of a plurality of motors, adapted to act as momentum driven generators, a brake switch having contacts for connecting up the generators to restore current to the line, a series-parallel switch for shifting the relation of said generators, a motor driven booster for maintaining the voltage of the regenerated current, a regulating device governed by the speed of the vehicle for controlling said motor-booster, fluid pressure apparatus for actuating said series-parallel switch and for adjusting the booster, and valve means governed by the speed of the vehicle for controlling the supply of fluid to said apparatus.

13. In a regenerative braking system, the combination of a plurality of motors, adapted to act as momentum driven generators, a brake switch having contacts for connecting up the generators to restore current to the line, a series-parallel switch for shifting the relation of said generators, a motor driven booster for maintaining the voltage of the regenerated current, a regulating device governed by the speed of the vehicle for controlling said motor-booster, and means also governed by the speed for shifting said series-parallel switch and for adjusting the speed of the booster motor.

14. In a regenerative braking system, the combination of a plurality of motors, adapted to act as momentum driven generators, a brake switch having contacts for connecting up the generators to restore current to the line, a series-parallel switch for shifting the relation of said generators, a motor driven booster for maintaining the voltage of the regenerated current, a regulating device governed by the speed of the vehicle for controlling said motor-booster, fluid pressure apparatus for actuating said series-parallel switch and for adjusting the speed of the booster motor, and valve means governed by the speed of the vehicle for controlling the supply of fluid to said apparatus.

15. In a regenerative braking system, the combination of a plurality of motors, adapted to act as momentum driven generators, a brake switch having contacts for connecting up the generators to restore current to the line, a series-parallel switch for shifting the relation of said generators, a motor driven booster for maintaining the voltage of the regenerated current, a spring operated regulating device governed by the speed for controlling the motor-booster, and means also governed by the speed for shifting said series-parallel switch and for adjusting the effective spring pressure of said regulating device.

16. In a regenerative braking sytem, the combination of a plurality of motors, adapted to act as momentum driven generators, a brake switch having contacts for connecting up the generators to restore current to the line, a series-parallel switch for shifting the relation of said generators, a motor driven booster for maintaining the voltage of the regenerated current, a spring operated regulating device governed by the speed of the vehicle for controlling said motor-booster, fluid pressure apparatus for actuating said series parallel switch and for adjusting the effective spring pressure of said regulating device, valve means for controlling the supply of fluid to said apparatus, and a speed governor for actuating said valve means.

17. In a regenerative braking system, the combination with a plurality of motors, adapted to act as momentum driven generators, and a brake switch having contacts for connecting up the generators to restore current to the line, of an air brake system, and automatic means for causing an application of the air brakes when the speed of the vehicle is reduced to a predetermined minimum.

18. In a regenerative braking system, the combination with a plurality of motors, adapted to act as momentum driven generators, and a brake switch having contacts for connecting up the generators to restore current to the line, of an air brake system, and means governed by the regenerated current for effecting an application of the air brakes when the speed of the generators is reduced to a predetermined minimum.

19. In a regenerative braking system, the combination with a plurality of motors, adapted to act as momentum driven generators, and a brake switch having contacts for connecting up the generators to restore current to the line, of an air brake system, a vent valve for effecting an application of the air brakes, and an electromagnet governed by the regenerated current for actuating said vent valve.

20. In a regenerative braking system, the combination with a plurality of motors, adapted to act as momentum driven generators, and a brake switch having contacts for connecting up the generators to restore current to the line, of an air brake system, a magnet valve governed by the regenerated current for effecting an application of the air brakes, and a valve operated by the movement of the brake switch for controlling communication to said vent valve.

21. In a regenerative braking system, the combination with a plurality of motors, adapted to act as momentum driven generators, and a brake switch having contacts for connecting up the generators to restore current to the line, of an air brake system, and automatic means for effecting an application of the air brakes when the speed of the vehicle exceeds a predetermined maximum.

22. In a regenerative braking system, the combination with a plurality of motors, adapted to act as momentum driven generators, and a brake switch having contacts for connecting up the generators to restore current to the line, of an air brake system, a vent valve for effecting an application of the air brakes, and means governed by the speed of the vehicle for opening said vent valve when the speed exceeds a predetermined maximum.

23. In a regenerative braking system, the combination with a plurality of motors, adapted to act as momentum driven generators, and a brake switch having contacts for connecting up the generators to restore current to the line, of an air brake system, a vent valve for effecting an application of the air brakes, mechanism operating to open said valve when the speed exceeds a predetermined maximum, and means for adjusting said mechanism to vary the maximum speed permissible.

24. In a regenerative braking system, the combination with a plurality of motors, adapted to act as momentum driven generators, and a brake switch having contacts for connecting up the generators to restore current to the line, of an air brake system, a vent valve for effecting an application of the air brakes, a speed governor for opening said valve when the speed exceeds a certain maximum, and means for manually adjusting the connection between said governor and the vent valve.

25. In a regenerative braking system, the combination with a plurality of motors, adapted to act as momentum driven generators, and a brake switch having contacts for connecting up the generators to restore current to the line, of an air brake system, a vent valve to effect an application of the air brakes when the speed exceeds a predetermined maximum, and a valve movable with the brake switch for controlling communication from the brake system to said vent valve.

26. In a regenerative braking system, the combination with a plurality of motors, adapted to act as momentum driven generators, and a brake switch having contacts for connecting up the generators to restore current to the line, of an air brake system, means for effecting an application of the air brakes and for opening the regenerative circuit when the speed falls below a predetermined minimum.

27. In a regenerative braking system, the combination with a plurality of motors, adapted to act as momentum driven generators, and a brake switch having contacts for connecting up the generators to restore current to the line, of an air brake system, a fluid pressure actuated switch normally closing the regenerative circuit when the brake switch is in braking position, and a magnet valve controlled by the current in said circuit for releasing air from the brake system and from said fluid pressure switch.

28. In a regenerative braking system, the combination with a plurality of motors, adapted to act as momentum driven generators, and a brake switch having contacts for connecting up the generators to restore current to the line, of an air brake system, a fluid pressure piston and switch for the regenerative circuit, a vent valve for effecting an application of the air brakes and releasing fluid from said piston when the speed falls below a predetermined minimum, and a valve movable with the brake switch for controlling communication to said vent valve.

29. In a regenerative braking system, the combination with a plurality of motors, adapted to act as momentum driven generators, and a brake switch having contacts for connecting up the generators to restore current to the line, of an air brake system, a fluid pressure actuated switch for the regenerative circuit, a magnet vent valve controlled by the regenerative current for releasing air from the brake system and from said piston, and a valve movable with the brake switch for cutting off said vent valve from the brake system and from said fluid pressure piston.

In testimony whereof we have hereunto set our hands.

WALTER V. TURNER.
THOMAS H. THOMAS.